US009166500B2

(12) United States Patent
Wu et al.

(10) Patent No.: US 9,166,500 B2
(45) Date of Patent: Oct. 20, 2015

(54) POWER DECOUPLING CONTROLLER AND METHOD FOR POWER CONVERSION SYSTEM

(71) Applicant: General Electric Company, Schenectady, NY (US)

(72) Inventors: Xinhui Wu, Niskayuna, NY (US); Jiao Liu, Shanghai (CN); Dan Hou, Shanghai (CN); Xueqin Wu, Shanghai (CN); Zhuohui Tan, Shanghai (CN)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 14/222,898

(22) Filed: Mar. 24, 2014

(65) Prior Publication Data
US 2014/0307494 A1    Oct. 16, 2014

(30) Foreign Application Priority Data

Apr. 11, 2013   (CN) .......................... 2013 1 0124975

(51) Int. Cl.
*H02M 7/537*     (2006.01)
*H02M 7/48*     (2007.01)
(Continued)

(52) U.S. Cl.
CPC ............. *H02M 7/537* (2013.01); *H02J 3/383* (2013.01); *H02J 3/48* (2013.01); *H02J 3/50* (2013.01); *H02M 7/48* (2013.01)

(58) Field of Classification Search
CPC   Y02E 40/34; H02M 1/42; H02M 2007/4803; H02M 7/48; H02M 7/537; H02M 7/5395; G05F 1/70; H02J 3/18; H02J 3/1892; H02J 3/383
USPC ......... 363/95, 97; 323/205, 207, 234; 290/44; 700/292, 298, 30
See application file for complete search history.

(56) References Cited

U.S. PATENT DOCUMENTS 4,251,736 A *   2/1981   Coleman .......................... 363/95
5,901,053 A      5/1999   Eriksson et al.
(Continued)

FOREIGN PATENT DOCUMENTS

| CN | 101534065 A | 9/2009 |
| CN | 101847875 A | 9/2010 |
| WO | 2009016340 A1 | 2/2009 |

OTHER PUBLICATIONS

"Decoupling control of the active and reactive power for a three-phase inverter", Liang,J., Green,T.C., Weiss,G. and Zhong,Q.C., Proceedings of the European control conference, Cambridge, UK, Sep. 2003.*

(Continued)

*Primary Examiner* — Adolf Berhane
*Assistant Examiner* — Jye-June Lee
(74) *Attorney, Agent, or Firm* — GE Global Patent Operation; Catherine J. Toppin (57) ABSTRACT

A power conversion system is disclosed including a DC bus for receiving DC power, a power converter for converting the DC power to AC power, and a controller. The controller includes an active power regulator for generating a phase angle command signal, a reactive power regulator for generating a voltage magnitude command, and an active power (P) and reactive power (Q) decoupling unit for decoupling interaction between the active and reactive power regulators. The PQ decoupling unit includes an active power compensation element and a reactive power compensation element. The active power compensation element is used for generating a phase angle compensation signal based on a reactive power error signal, to compensate the phase angle command signal. The reactive power compensation element is used for generating a voltage magnitude compensation signal based on an active power error signal, to compensate the voltage magnitude command signal.

20 Claims, 10 Drawing Sheets

(51) Int. Cl.
*H02J 3/38* (2006.01)
*H02J 3/48* (2006.01)
*H02J 3/50* (2006.01)

(56) References Cited

U.S. PATENT DOCUMENTS

| | | | |
|---|---|---|---|
| 6,185,468 B1* | 2/2001 | Wells | 700/30 |
| 7,321,500 B2 | 1/2008 | Asplund et al. | |
| 2011/0130889 A1* | 6/2011 | Khajehoddin et al. | 700/298 |
| 2011/0153113 A1 | 6/2011 | Harnefors | |
| 2012/0033461 A1 | 2/2012 | Papafotiou et al. | |
| 2012/0083935 A1* | 4/2012 | Wells | 700/292 |
| 2012/0112714 A1 | 5/2012 | Agudo | |
| 2012/0280569 A1 | 11/2012 | Alam et al. | |
| 2012/0292904 A1* | 11/2012 | Tarnowski | 290/44 |
| 2013/0027997 A1* | 1/2013 | Tan et al. | 363/95 |

OTHER PUBLICATIONS

"Decoupling and Control of Real and Reactive Power in Grid-Connected Photovoltaic Power System", T. Allaoui, M. A. Denai, International Workshop on integration of solar power into power systems, London UK, 2013.*

Hu et al., "Modeling and Control of Grid-Connected Voltage-Sourced Converters Under Generalized Unbalanced Operation Conditions", IEEE Transactions on Energy Conversion, vol. 23, Issue 3, pp. 903-913, Sep. 2008.

Rosas et al., "Active and Reactive Current Decoupled Control Strategy Applied to a Single-Phase BTB Converter", 6th International Conference on Electrical Engineering, Computing Science and Automatic Control,CCE, pp. 1-6, Jan. 10-13, 2009, Location: Toluca.

Zhou et al., "Application of Voltage PWM Rectifier in the Charger of Electric Vehicles Based on Power Feed-Forward Decoupling Control", Electric utility deregulation and restructuring and power technologies (DRPT), 2011 4TH International Conference ON, IEEE, pp. 554-557, Jul. 6, 2011.

Errami et al., "Control Strategy for PMSG Wind Farm Based on MPPT and Direct Power Control", Multimedia Computing and Systems (ICMGS), 2012 International Conference on, IEEE, pp. 1125-1130, May 10, 2012.

Lar et al., "Current Control Methods for Grid-Side Three-Phase PWM Voltage-Source Inverter in Distributed Generation Systems", Optimization of Electrical and Electronic Equipment (OPTIM), 2012 13TH International Conference ON, IEEE, pp. 859-867, May 24, 2012.

European Search Report and Opinion issued in connection with corresponding EP Application No. 14163151.5 on Jul. 6, 2015.

* cited by examiner

POWER DECOUPLING CONTROLLER AND METHOD FOR POWER CONVERSION SYSTEM

BACKGROUND

Embodiments of the disclosure relate generally to power conversion systems and methods for converting and providing electrical power to feed an electrical system.

Renewable power, such as solar power generated by solar power generation systems, is becoming a larger source of energy throughout the world. A typical solar power generation system includes one or more photovoltaic arrays (PV arrays) having multiple interconnected solar cells. The solar cells of the PV arrays convert solar energy into DC power. In order to interface the output of the PV arrays to a power grid, a solar power converter is typically used to change the DC power from the PV arrays into AC power to feed a power grid.

Various solar power converter configurations exist for converting the DC power output from PV arrays into AC power. One implementation of a solar power converter has two stages including a DC-DC converter stage and a DC-AC converter stage. The DC-DC converter controls the flow of DC power from the PV arrays onto a DC bus. The DC-AC converter converts the DC power supplied to the DC bus into AC power that can be output to the power grid. Existing solar power converters further utilize power converter controllers to regulate the DC-DC converter and the DC-AC converter to compensate for various system variables, such as DC bus voltage, AC grid voltage, AC grid current, and frequency, for example.

In one proposed method for using voltage source control (VSC) for a power generation system, the converter is designed to emulate a synchronous generator. In the propose method, active and reactive power control loops of the VSC converter are built in a manner not taking into account the resistance between the converter and the power grid side. When grid impedance and the resistance of main circuit are small enough, active and reactive power can be considered as decoupled. In some systems, virtual impedance is added in a control loop to enhance the system's stability. Active and reactive power may be coupled due to the resistance, including real and virtual resistance. In other words, one of them may be impacted by the variation of the other one. The interaction between active and reactive power makes it difficult to control active and reactive power separately.

Therefore, it is desirable to provide systems and methods to address the above-mentioned problems.

BRIEF DESCRIPTION

In accordance with one embodiment disclosed herein, a power conversion system is provided. The power conversion system includes a DC bus for receiving DC power, a power converter for converting the DC power to AC power, and a controller. The controller includes an active power regulator for generating a phase angle command signal, a reactive power regulator for generating a voltage magnitude command, and an active power (P) and reactive power (Q) decoupling unit for decoupling interaction between the active and reactive power regulators. The PQ decoupling unit includes an active power compensation element and a reactive power compensation element. The active power compensation element is used for generating a phase angle compensation signal based on a reactive power error signal, to compensate the phase angle command signal. The reactive power compensation element is used for generating a voltage magnitude compensation signal based on an active power error signal, to compensate the voltage magnitude command signal.

In accordance with another embodiment disclosed herein, a method of operating a power conversion system is provided. The method includes generating a phase angle command signal based on an active power command signal and an active power feedback signal; generating a voltage magnitude command signal based on a reactive power command signal and a reactive power feedback signal; generating a phase angle compensation signal based on a reactive power error signal, to compensate the phase angle command signal; generating a voltage magnitude compensation signal based on an active power error signal, to compensate the voltage magnitude command signal; and generating control signals for a power converter of the power conversion system for causing an AC voltage output from the power converter to decouple interaction between an active power loop and a reactive power loop based on the compensated phase angle command signal and the compensated voltage magnitude command signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments disclosed herein relate generally to a power conversion system having compensation functions to decouple/eliminate the interaction between the active power loop and the reactive power loop of the power conversion system. The power conversion system includes a DC bus for receiving DC power, a power converter for converting the DC power to AC power, and a controller. The controller includes an active power regulator for generating a phase angle command signal, a reactive power regulator for generating a voltage magnitude command, and an active power (P) and reactive power (Q) decoupling unit for decoupling interaction between the active and reactive power regulators. The PQ decoupling unit includes an active power compensation element and a reactive power compensation element. The active power compensation element is used for generating a phase angle compensation signal based on a reactive power error signal, to compensate the phase angle command signal. The reactive power compensation element is used for generating a voltage magnitude compensation signal based on an active power error signal, to compensate the voltage magnitude command signal.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and may be optionally be connected or otherwise coupled together to provide the described function.

Figure 1:
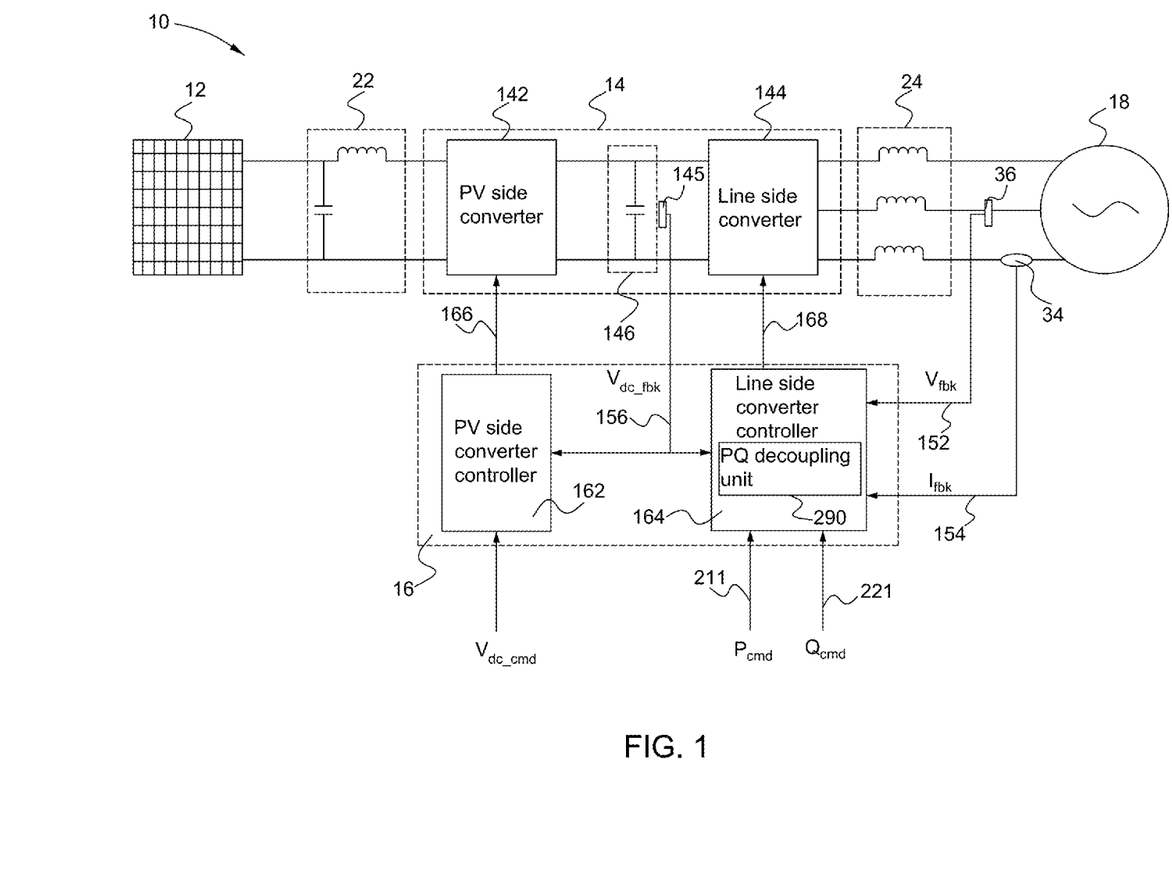
FIG. 1 is a schematic block diagram of a solar power conversion system in accordance with an exemplary embodiment of the present disclosure.

FIG. 1 illustrates a schematic block diagram of a power conversion system 10 in accordance with an exemplary embodiment of the present disclosure. For ease of illustration, the power conversion system 10 is illustrated and described in the context of a solar power conversion system. However, a person having ordinary skill in the art will readily understand that the embodiments described herein are not limited to solar applications, as certain aspects of the disclosure, for example voltage source control (VSC) based power decoupling compensation, can be applied in a similar manner to other types of power conversion systems, including but not limited to, fuel cell systems, wind power systems, and tidal power systems, for example.

In general, the solar power conversion system 10 shown in FIG. 1 includes a solar power converter system 14 configured to be an interface between a solar power source 12 and a power grid 18. More specifically, the solar power converter system 14 is configured to convert power in a form of direct current (DC) voltage or current (hereinafter referred to as DC power) generated from a solar power source 12 into power in the form of alternating current (AC) voltage or current (hereinafter referred to as AC power) suitable for feeding an electrical system shown as power grid 18. In one embodiment, the solar power source 12 may include one or more photovoltaic arrays (PV arrays) having multiple interconnected solar cells that can convert solar radiation energy into DC power through the photovoltaic effect. In one embodiment, the electrical system 18 will be described below as an AC power grid, and the solar power conversion system 10 is configured for delivering nominally fixed frequency three-phase AC power. In other embodiments, the electrical system 18 may comprise an AC load, such as an AC electrical motor.

In one implementation, the power converter system 14 shown in FIG. 1 is based on a two-stage structure including a PV side converter 142 and a line side converter 144. The PV side converter 142 may comprise a DC-DC converter, such as a DC-DC boost converter, that steps up a DC voltage received from the power source 12 and outputs a higher DC voltage onto a DC bus 146. The DC bus 146 may include one or more capacitors for maintaining the DC voltage of the DC bus 146 at a certain level, and thus the energy flow from the DC bus 146 to the power grid 18 can be managed. The line side converter 144 may comprise a DC-AC inverter that converts the DC voltage on the DC bus 146 to AC voltage with suitable frequency, phase, and magnitude for feeding to the AC power grid 18. In other implementations, the power converter system 14 may be based on a single stage converter structure including a DC-AC converter for converting DC voltage at a DC bus to AC voltage with suitable frequency and voltage magnitude to feed the power grid 18.

In one implementation, the power conversion system 10 shown in FIG. 1 further comprises a power converter controller 16 configured to regulate the power at the output of the line side converter 144. In one implementation, the power converter controller 16 comprises a PV side converter controller 162 and a line side converter controller 164. The PV side converter controller 162 sends PV side control signals 166 to the PV side converter 142 to regulate the power on DC link 146 according to various command signals and feedback signals (shown as $V_{dc\_cmd}$ and $V_{dc\_fbk}$ 156 (from voltage sensor 145), for example). The line side converter controller 164 is configured to send line side control signals 168 to the line side converter 144 to regulate the active power and/or reactive power output from the line side converter 144 according to various command signals and feedback signals (shown as $P_{cmd}$ 211, $Q_{cmd}$ 221, $V_{dc\_fbk}$ 156, $V_{fbk}$ 152 (from voltage sensor 36), and $I_{fbk}$ 154 (from current sensor 34), for example). The PV side converter 142 may comprise any type of converter topology such as a half bridge converter, a full bridge converter, or a push-pull converter, for example. The line side converter 144 may comprise any type of DC to AC converter topology such as a 2-level converter or a 3-level converter, for example. The PV side converter 142 and the line side converter 144 may comprise a plurality of semiconductor switching devices (not shown), including but not limited to, integrated gate commutated thyristors (IGCTs) and insulated gate bipolar transistors (IGBTs), for example. The switching devices are switched on and off in response to the PV side control signals 166 and the line side control signals 168 respectively. Although two controllers 162, 164 are illustrated and described herein, in other embodiments, a single controller may be used to control both of the PV side converter 142 and the line side converter 144.

In one implementation, the power conversion system 10 shown in FIG. 1 may further comprise a PV side filter 22 having one or more capacitive and inductive elements for removing ripple components of the DC power output from the solar power source 12 and blocking ripple signals from being transformed from the PV side converter 142 to the solar power source 12. The power conversion system 10 may further include a line side filter 24 having one or more inductive elements or capacitive elements (not shown) for removing harmonic signals for each phase of the three-phase AC voltage or AC current output from the line side converter 144.

With continuing reference to FIG. 1, the power conversion system 10 further includes an active power (P) and reactive power (Q) decoupling unit 290 for addressing the interaction between an active power loop and a reactive power loop of the line side converter controller 164. In one implementation, as illustrated, a common controller may be used such that the PQ decoupling unit 290 is embedded within the line side converter controller 164. Alternatively, the controller embodiment may include the PQ decoupling unit 290 implemented outside of the line side converter controller 164 or partly within the line side converter controller 164. More specifically, the PQ decoupling unit 290 is configured for providing compensation for the active power loop and the reactive power loop of the line side converter controller 164 respectively, to decouple the interaction between them. With this adjustment, the active power loop and the reactive power loop are more stable and independent. More detailed description of the PQ decoupling unit 290 will be described below.

Figure 2:
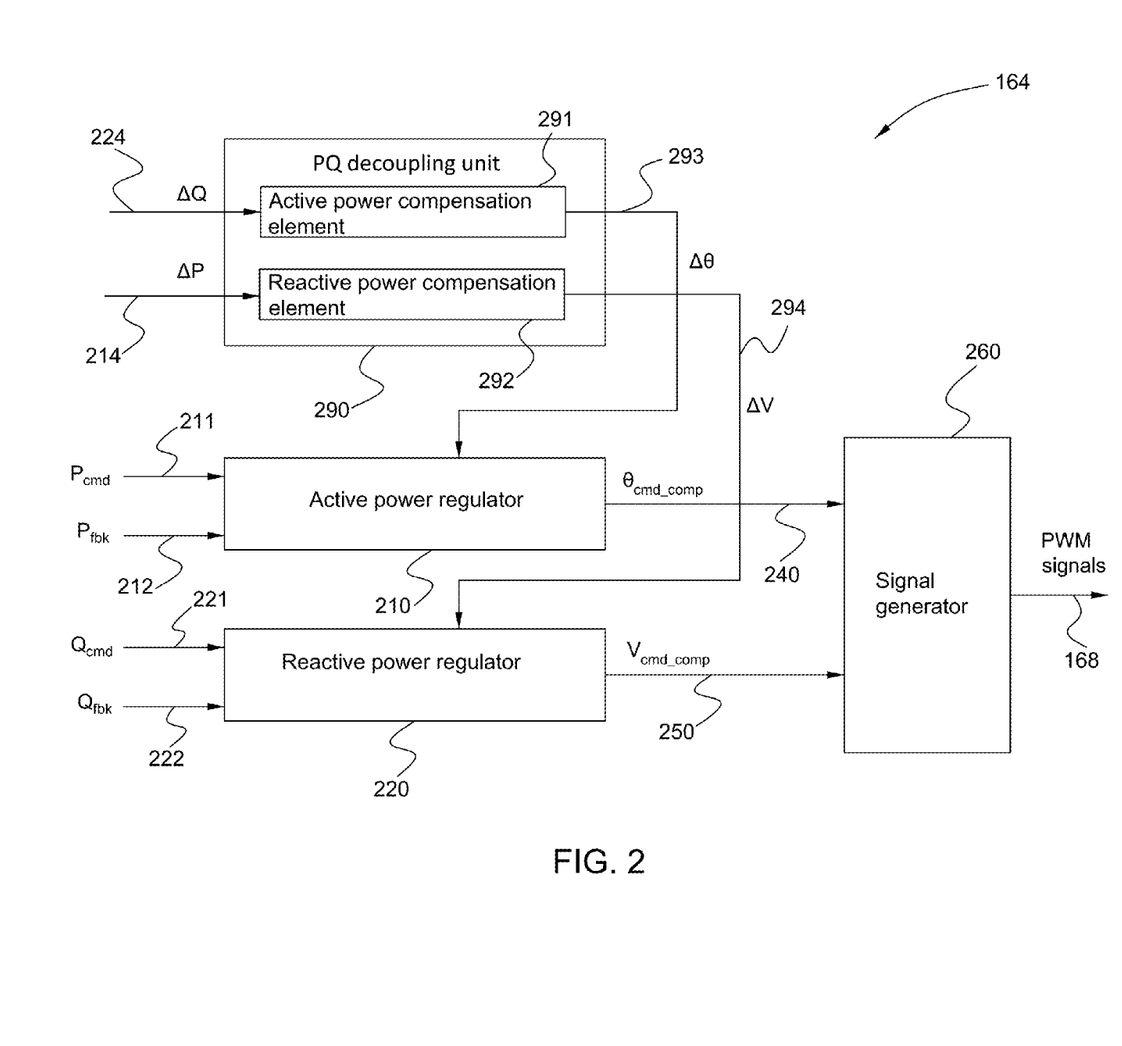
FIG. 2 is a control diagram of a line side converter controller of the solar power conversion system shown in FIG. 1 in accordance with an exemplary embodiment of the present disclosure.

FIG. 2 illustrates at least a part of an overall control diagram of the line side converter controller 164 in accordance with an exemplary embodiment of the present disclosure. The functional blocks of the line side converter controller 164 illustrated in FIG. 2 can be implemented in hardware, firmware, software, or a combination thereof. In practical applications, the line side converter controller 164 may be implemented by a micro-controller, a digital signal processor (DSP), or any other appropriate programmable devices. In an exemplary embodiment, the line side converter controller 164 is constructed based on a voltage source control (VSC) structure.

In the illustrated embodiment of FIG. 2, the VSC based line side converter controller 164 comprises an active power regulator 210 that is configured to receive an active power command signal 211 and an active power feedback signal 212 and generate a phase angle command signal 240 based at least on the active power command signal 211 and the active power feedback signal 212. The active power command signal 211 represents the desired power to be output by the line side converter 144 (see FIG. 1) and may be dictated by a grid operator or a design parameter, for example. The active power feedback signal 212 represents the actual active power. The phase angle command signal 240 represents a desired phase angle of the AC voltage to be output from the line side converter 144. The active power feedback signal 212 may be obtained by multiplication of a feedback current signal 154 and a feedback voltage signal 152. The feedback current signal 154 and feedback voltage signal 152 may be obtained from a current sensor 34 and a voltage sensor 36 (shown in FIG. 1) placed between the line side converter 144 and the grid 18. In one implementation, the current sensor 34 and the voltage sensor 36 may comprise Hall Effect sensors for example. Although the sensors 34 and 36 are shown in FIG. 1 as being present between filter 24 and grid 18 at a point of common coupling for purposes of example, the measurements to be used for obtaining the power feedback signals may be obtained at any desired location along the electrical path from the line side converter 144 to the grid 18.

With continued reference to FIG. 2, the VSC based line side converter controller 164 further comprises a reactive power regulator 220 that is configured to receive a reactive power command signal 221 and a reactive power feedback signal 222 and generate a voltage magnitude command signal 250 based at least on the reactive power command signal 221 and the reactive power feedback signal 222. The reactive power command signal 221 represents the desired reactive power at the output of line side converter 144 and may be dictated by a grid operator or a design parameter, for example. The reactive power feedback signal 222 represents the actual reactive power and may be obtained by calculation of a feedback current signal 154 and a feedback voltage signal 152 (see FIG. 1). The voltage magnitude command signal 250 represents a desired voltage magnitude of the AC voltage output from the line side converter 144.

With continued reference to FIG. 2, the VSC based line side converter controller 164 further includes the PQ decoupling unit 290 including an active power compensation element 291 and a reactive power compensation element 292. The active power compensation element 291 is configured to receive a reactive power error signal 224 to generate a phase angle compensation signal 293 based at least on the reactive power error signal 224. The reactive compensation element 292 is configured to receive an active power error signal 214 to generate a voltage magnitude compensation signal 294 based at least on the active power error signal 214. The active power error signal 214 represents a variation of the active power. In one embodiment, the active power error signal 214 is equal to a difference between the active power command signal 211 and the active power feedback signal 212, namely $\Delta P = P_{cmd} - P_{fbk}$. In another embodiment, the active power error signal 214 is equal to a difference between two active power feedback signals 212 at different time points, namely $\Delta P = P_{fbk2} - P_{fbk1}$. The active power error signal 214 also can be obtained based on other formulas representing the variation of the active power. The reactive power error signal 224 represents a variation of the reactive power. In one embodiment, the reactive power error signal 224 is equal to a difference between the reactive power command signal 221 and the reactive power feedback signal 222, namely $\Delta Q = Q_{cmd} - Q_{fbk}$. In another embodiment, the reactive power error signal 224 is equal to a difference between two active power feedback signals 222 at different time points, namely $\Delta Q = Q_{fbk2} - Q_{fbk1}$. The reactive power error signal 224 also can be obtained based on other formulas representing the variation of the reactive power.

In the embodiment of FIG. 2, the phase angle compensation signal 293 is provided to the active power regulator 210, and used to provide a compensation to decouple the interaction between the active power regulator 210 and the reactive power regulator 220. The voltage magnitude compensation signal 294 is provided to the reactive power regulator 220, and also used to provide a compensation to decouple the interaction between the active power regulator 210 and the reactive power regulator 220 together with the phase angle compensation signal 293. After compensating by the phase angle compensation signal 293 and the voltage magnitude compensation signal 294, the active power regulator 210 and the reactive power regulator 220 respectively output a compensated phase angle command signal 240 and a compensated voltage magnitude command signal 250, which decouples the interaction between the active power regulator 210 and the reactive power regulator 220 in subsequent control processes.

With continued reference to FIG. 2, a signal generator 260 is configured for generating the line side control signals 168 for the line side converter 144 (see FIG. 1) according to the compensated phase angle command signal 240 and the compensated voltage magnitude command signal 250. In one implementation, the signal generator 260 may comprise a pulse width modulation (PWM) signal generator for generating the line side control signals 168 in PWM pattern for the line side converter 144.

Figure 3:
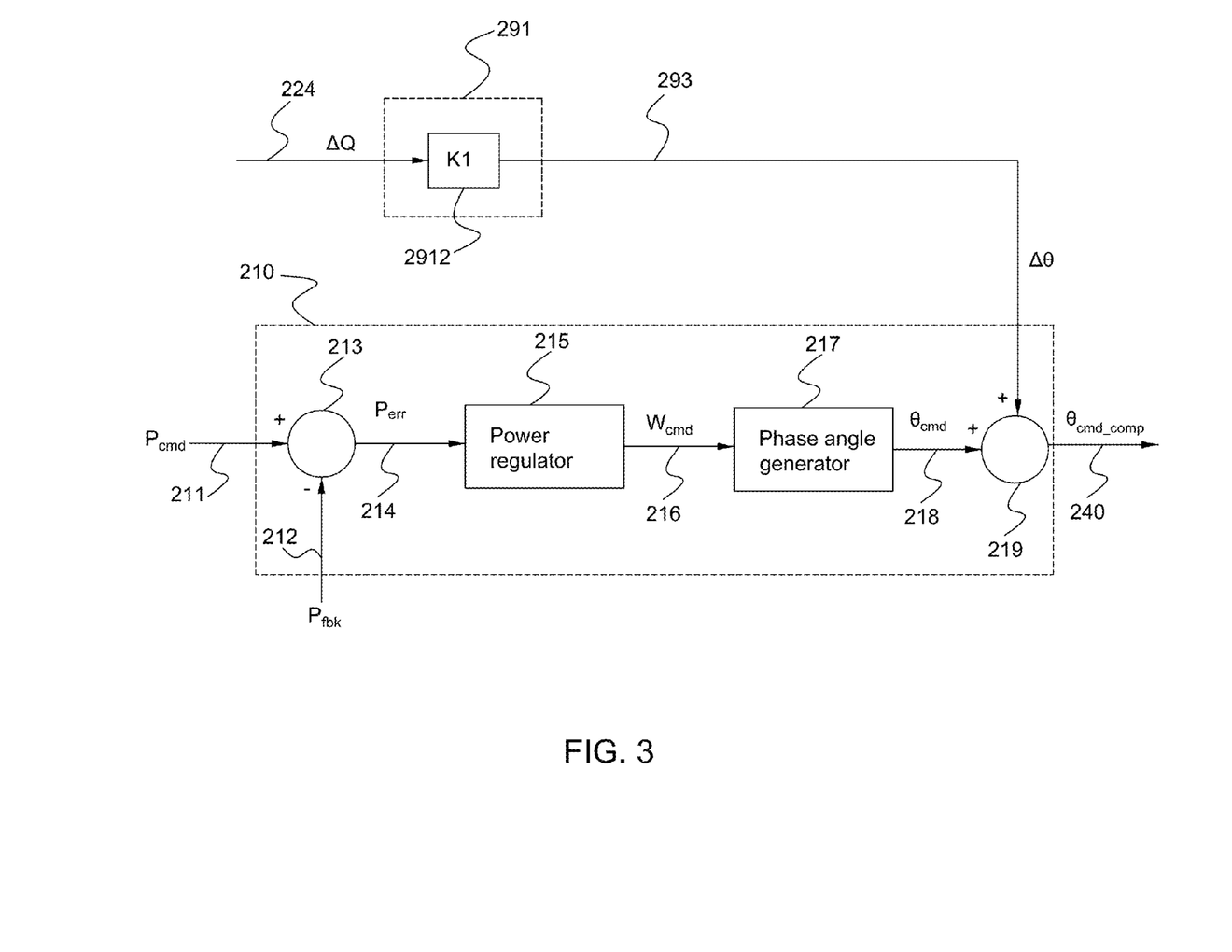
FIG. 3 is a control diagram of an active power regulator and an active power compensation element of the line side converter controller shown in FIG. 2 in accordance with an exemplary embodiment of the present disclosure.

Referring to FIG. 3, a control diagram of the active power regulator 210 and the active power compensation element 291 in accordance with an exemplary embodiment of the present disclosure is shown. As an example, the active power regulator 210 may include a summation element 213, a power regulator 215, and a phase angle generator 217. The summation element 213 subtracts the active power feedback signal 212 from the active power command signal 211 and provides an active power error signal 214 representing a difference between the active power command signal 211 and the active power feedback signal 212. The active power error signal 214 is supplied to the power regulator 215, and acts as the active power error signal 214 provided to the reactive power compensation element 292 in some embodiments. The power regulator 215 generates a frequency command signal 216 according to the active power error signal 214. The frequency command signal 216 is supplied to the phase angle generator 217. The phase angle generator 217 generates a phase angle command signal 218 according to the frequency command signal 216. In this illustrated embodiment, the active power regulator 210 further includes a summation element 219 used to add the phase angle compensation signal 293 into the phase angle command signal 218, and then the compensated phase angle command signal 240 is generated accordingly, which can reduce/eliminate the interaction influence from the reactive power regulator 220. The compensated phase angle command signal 240 is further used by the signal generator 260 (shown in FIG. 2) for generation of the line side control signal 168 mentioned above.

In the illustrated embodiment, the active power compensation element 291 includes a proportional element 2912 having a proportional factor K1, namely $\Delta\theta=K1*\Delta Q$. The proportional factor K1 can be calculated based on the following formula derivation according to power transmission theory.

$$P_B=[(V_A*V_B*\sin(\theta_A-\theta_B)+R*Q_B]/X \quad (1)$$

$$Q_B=[(V_A*V_B*\cos(\theta_A-\theta_B)-V^2_B-R*P_B]/X \quad (2)$$

Wherein, $P_B$ is an active power from a point A to a point B of the power conversion system 10, $Q_B$ is a reactive power from the point A to the point B of the power conversion system 10. For example, A is a point between the line side converter 144 and the line side filter 24, B is a point between line side filter 24 and grid 18. $V_A$ is the voltage of the point A, $V_B$ is the voltage of the point B. $\theta_A$ is the phase angle of voltage vector $V_A$, $\theta_B$ is the phase angle of voltage vector $V_B$. R is the resistance between the point A and the point B. X is the reactance between the point A and the point B. According to the formulas (1) and (2), the active power $P_B$ and the reactive power $Q_B$ have a coupled interaction therebetween, which needs to be decoupled/reduced.

The formula (1) can be deduced as below:

$$P_B=[(V_A*V_B*\sin(\theta_A-\theta_B)+R*Q_B]/X$$

$$\partial P_B/\partial Q_B=[V_A*V_B*\cos(\theta_A-\theta_B)/X]*[\partial(\theta_A-\theta_B)/\partial Q_B]+R/X=0$$

$$\partial(\theta_A-\theta_B)=[-R/V_A*V_B*\cos(\theta_A-\theta_B)]*\partial Q_B$$

$$\Delta(\theta_A-\theta_B)=[-R/V_A*V_B*\cos(\theta_A-\theta_B)]*\Delta Q_B$$

$$K1=-R/V_A*V_B*\cos(\theta_A-\theta_B) \quad (3)$$

According above derivation, the proportional factor K1 is calculated as shown in formula (3). It is understood that, the resistance R can be obtained according to the detailed design of the power conversion system 10. The parameters $V_A$, $V_B$, $\theta_A$, $\theta_B$ can be obtained by some corresponding sensors mentioned before, or other typical methods. In some embodiments, if the compensation requirement is not very high, this formula (3) can be further simplified. In detail, the $\cos(\theta_A-\theta_B)$ is about equal to 1, and $V_A$ and $V_B$ each is about equal to a voltage base value $V_{Base}$ which can determined in advance. Therefore, $K1=(-R/V^2_{Base})$.

Figure 4:
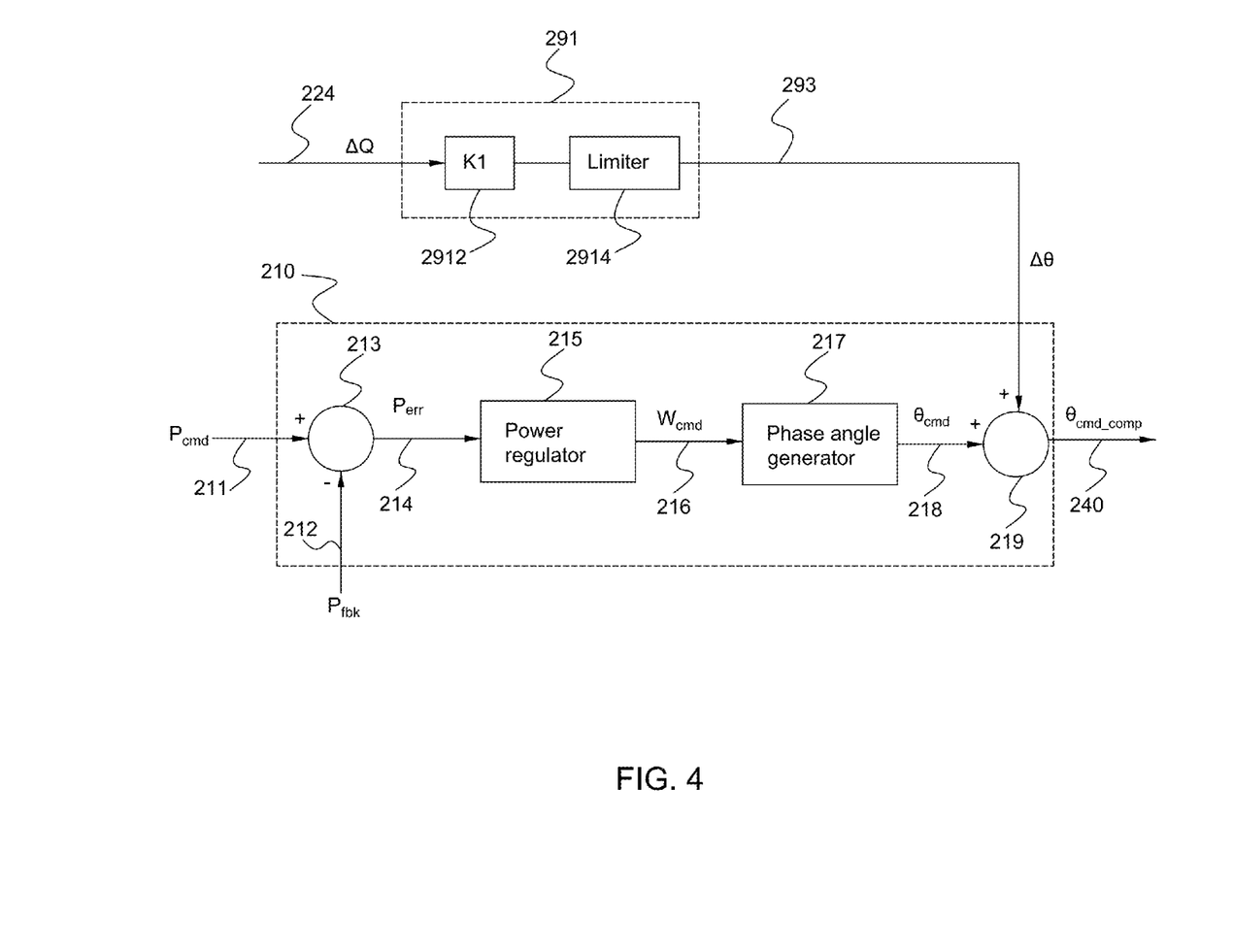
FIG. 4 is a control diagram of an active power regulator and an active power compensation element of the line side converter controller shown in FIG. 2 in accordance with another exemplary embodiment of the present disclosure.

Referring to FIG. 4, a control diagram of the active power regulator 210 and the active power compensation element 291 in accordance with another exemplary embodiment of the present disclosure is shown. In comparison to the embodiment of FIG. 3, in FIG. 4 a limiter 2914 is further added. The limiter 2914 is configured to limit the adjusted proportional factor K1 according to a predetermined threshold value. In alternative embodiments, the limiter 2914 also can be configured to limit the phase angle command signal 240 before sending to the signal generator 260. In other embodiments, the proportional factor K1 also can be adjusted by other adjusting elements, such as filters, comparators, etc.

Figure 5:
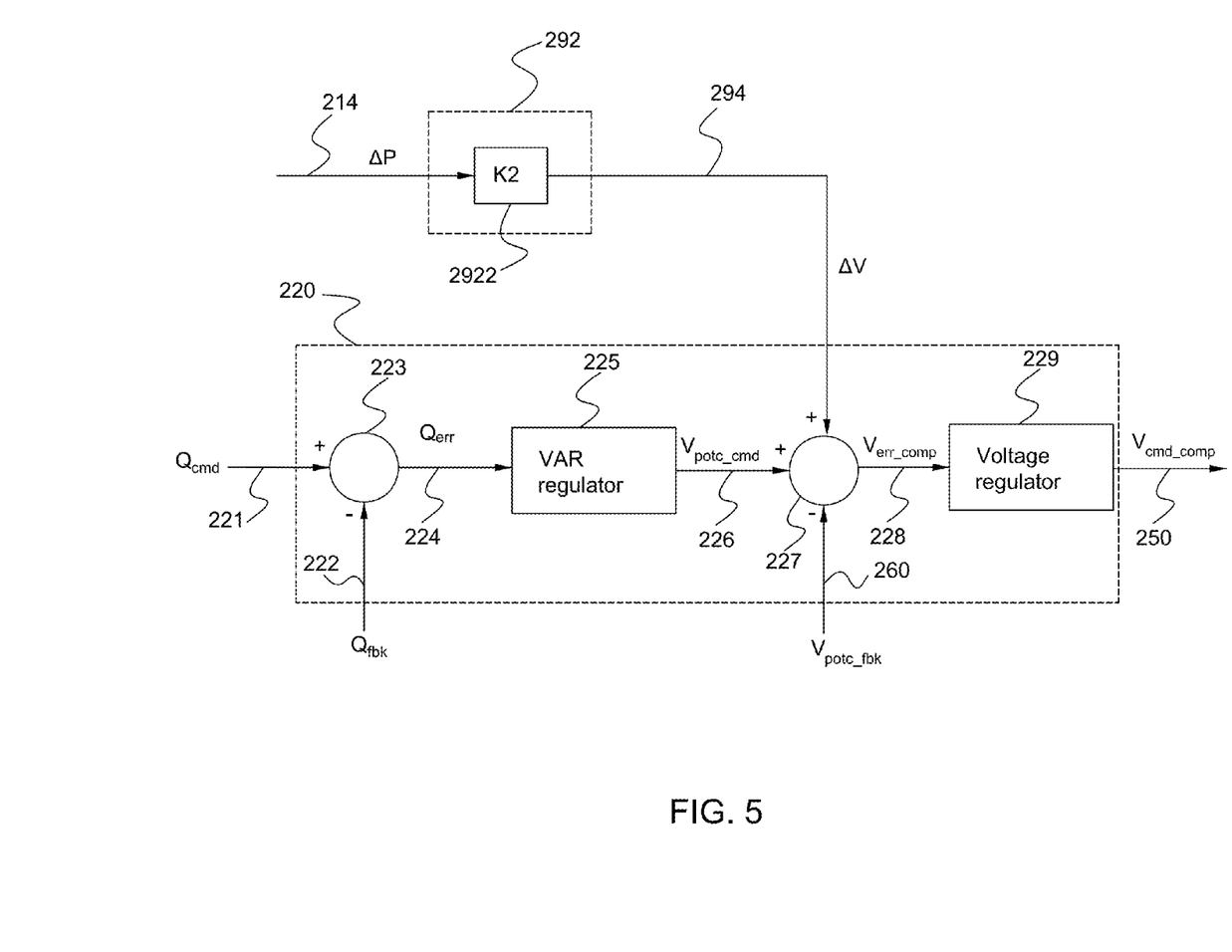
FIG. 5 is a control diagram of a reactive power regulator and a reactive power compensation element of the line side converter controller shown in FIG. 2 in accordance with an exemplary embodiment of the present disclosure.

Referring to FIG. 5, a control diagram of the reactive power regulator 220 and the reactive power compensation element 292 in accordance with an exemplary embodiment of the present disclosure is shown. As an example, the reactive power regulator 220 may include a summation element 223, a VAR regulator 225, a summation element 227, and a voltage regulator 229. The summation element 223 subtracts the reactive power feedback signal 222 from the reactive power command signal 221 and generates a reactive power error signal 224. The reactive power error signal 224 is supplied to the VAR regulator 225, and acts as the reactive power error signal 224 provided to the active power compensation element 291 in some embodiments. The VAR regulator 225 may comprise a proportional-integral (PI) regulator that is configured to generate a point of test coupling (POTC) voltage command signal 226 according to the reactive power error signal 224. The POTC voltage command signal 226 generated from the VAR regulator 225 represents a desired voltage to be achieved at a POTC. The summation element 227 subtracts a POTC voltage feedback signal 260 from the POTC voltage command signal 226 and produces a POTC voltage error signal 228. The voltage regulator 229 generates the voltage magnitude command signal 250 according to the POTC voltage error signal 228. In this illustrated embodiment, the summation element 227 further adds the voltage magnitude compensation signal 294 into the POTC voltage error signal 228, and then the compensated voltage magnitude command signal 250 is generated accordingly, which can reduce/eliminate the interaction influence from the active power regulator 210. The compensated voltage magnitude command signal 250 is further used by the signal generator 260 (shown in FIG. 2) for generation of the line side control signal 168 mentioned above.

In the illustrated embodiment, the reactive power compensation element 292 includes a proportional element 2922 having a proportional factor K2, namely ΔV=K2*ΔP. The proportional factor K2 can be calculated based on the following derivation of formula (2).

$$Q_B = [(V_A * V_B * \cos(\theta_A - \theta_B) - V^2_B - R * P_B]/X$$

$$\partial Q / \partial P_B = [V_A * \cos(\theta_A - \theta_B)/X] * [\partial V_B / \partial P_B] - R/X = 0$$

$$\partial V_B = [R/V_A * \cos(\theta_A - \theta_B)] * \partial P_B$$

$$\Delta V_B = [R/V_A * \cos(\theta_A - \theta_B)] * \Delta P_B$$

$$K2 = R/V_A * \cos(\theta_A - \theta_B) \quad (4)$$

According above derivation, the proportional factor K2 is calculated as shown in formula (4). In some embodiments, if the compensation requirement is not very high, this formula (4) can be further simplified. In detail, the $\cos(\theta_A - \theta_B)$ is about equal to 1, and $V_A$ and $V_B$ each is about equal to the voltage base value $V_{Base}$. Therefore, K2=(R/$V_{Base}$).

Figure 6:
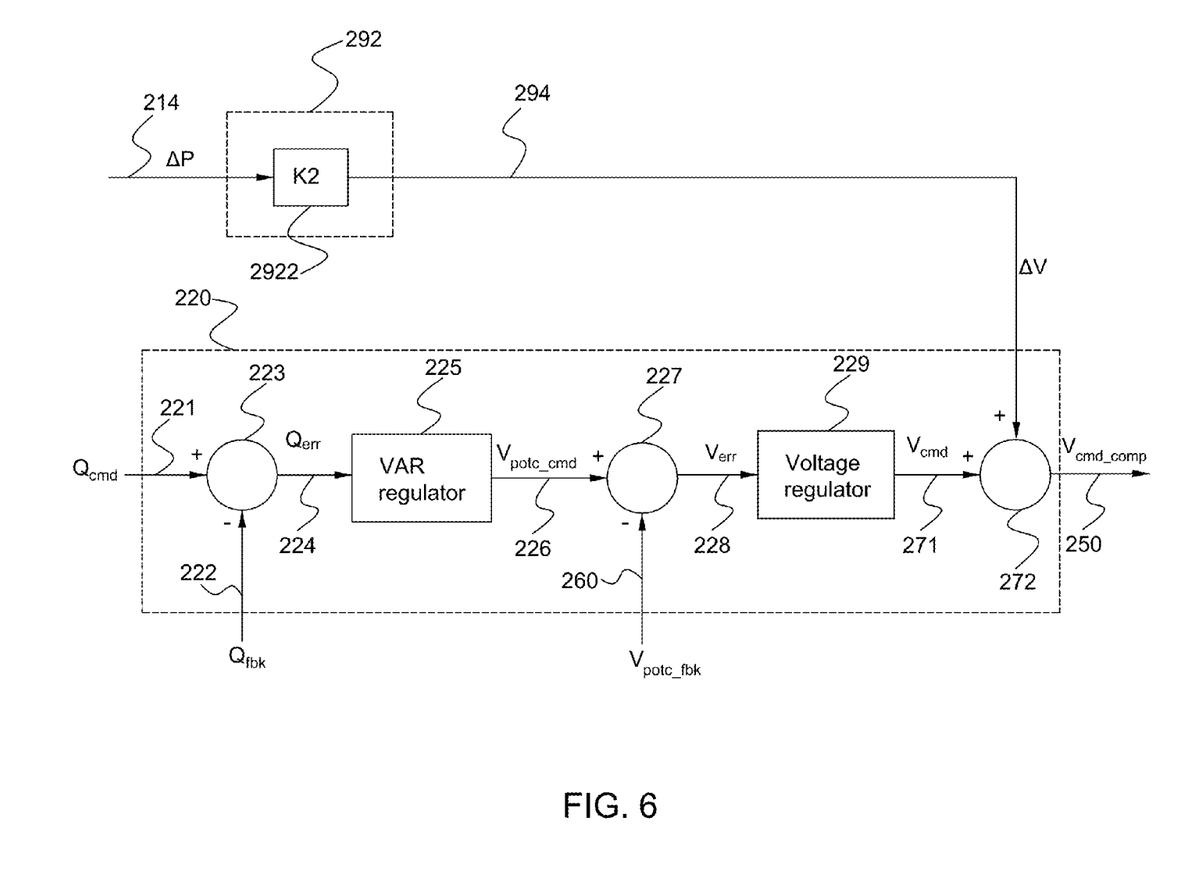
FIG. 6 is a control diagram of a reactive power regulator and a reactive power compensation element of the line side converter controller shown in FIG. 2 in accordance with another exemplary embodiment of the present disclosure.

Referring to FIG. 6, a control diagram of the reactive power regulator 220 and the reactive power compensation element 292 in accordance with another exemplary embodiment of the present disclosure is shown. In comparison to the embodiment of FIG. 5, in FIG. 6 a summation element 272 is added after the voltage regulator 229, and the voltage magnitude compensation signal 294 is changed to add into a voltage magnitude command signal 271 generated by the voltage regulator 229. Then, the compensated voltage magnitude command signal 250 is generated by combining the voltage magnitude command signal 271 and the voltage magnitude compensation signal 294. In other embodiments, the phase angle compensation signal 293 and the voltage magnitude compensation signal 294 can be added into the active power regulator 210 and the reactive power regulator 220 through other modes.

Figure 7:
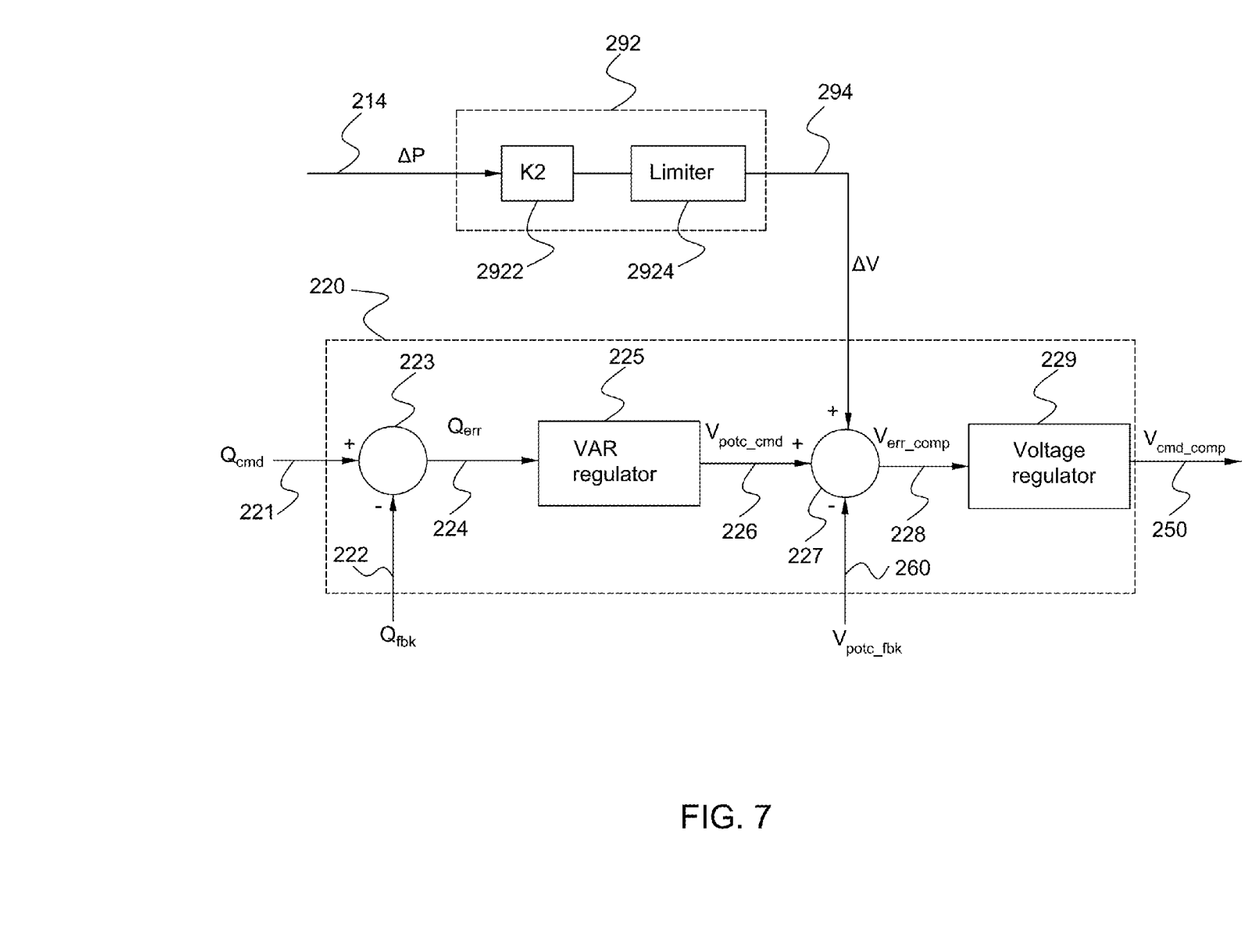
FIG. 7 is a control diagram of a reactive power regulator and a reactive power compensation element of the line side converter controller shown in FIG. 2 in accordance with yet another exemplary embodiment of the present disclosure.

Referring to FIG. 7, a control diagram of the reactive power regulator 220 and the reactive power compensation element 292 in accordance with yet another exemplary embodiment of the present disclosure is shown. In comparison to the embodiment of FIG. 5, in FIG. 7 a limiter 2924 is further added. The limiter 2924 is configured to limit the adjusted proportional factor K2 according to a predetermined threshold value. In alternative embodiments, the limiter 2924 also can be configured to limit the voltage magnitude command signal 250 before sending to the signal generator 260. In other embodiments, the proportional factor K2 also can be adjusted by other adjusting elements, such as filters, comparators, etc.

Figure 8A:
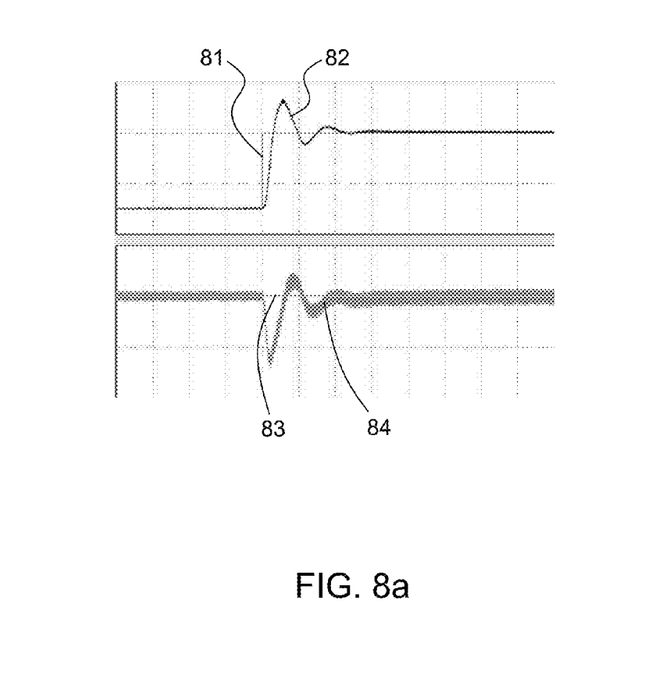
FIGS. 8a and 8b are two simulation diagrams showing active power step response of the line side converter controller shown in FIG. 2 respectively without and with the active power compensation element shown in FIG. 3.
Figure 8B:
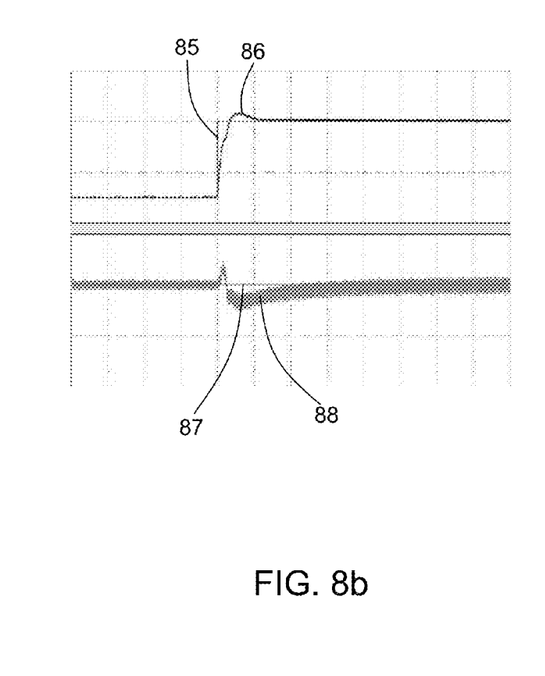

FIGS. 8a and 8b are two simulation diagrams showing active power step response of the line side converter controller 164 respectively without and with the PQ decoupling unit 290. In FIG. 8a, the waves 81 and 82 are active power command wave and active power response wave respectively, and the waves 83 and 84 are reactive power command wave and reactive power response wave respectively. When active power has a step command and reactive power command keeps the same, the variation of active power influences the reactive power to a great extent. In FIG. 8b, the waves 85 and 86 are active power command wave and active power response wave respectively, and the waves 87 and 88 are reactive power command wave and reactive power response wave respectively. When active power has a step command and reactive power command keeps the same, the variation of active power influences the reactive power to a much lower extent.

Figure 9A:
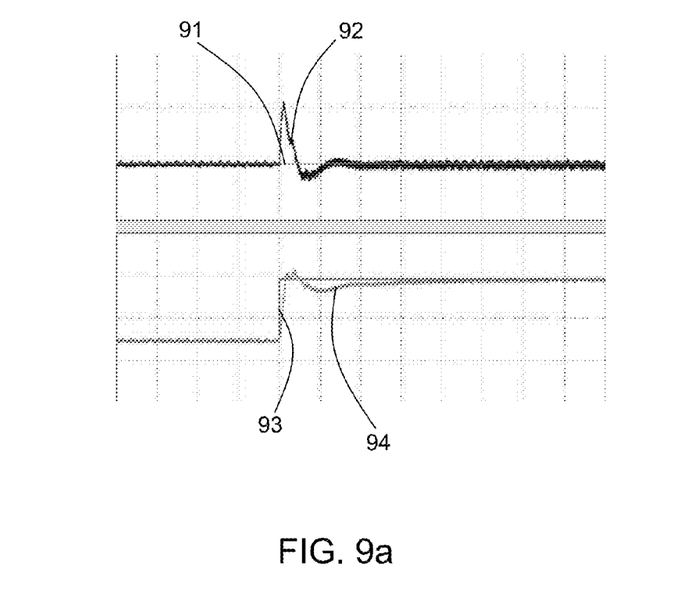
FIGS. 9a and 9b are two simulation diagrams showing reactive power step response of the line side converter controller shown in FIG. 2 respectively without and with the reactive power compensation element shown in FIG. 5.
Figure 9B:
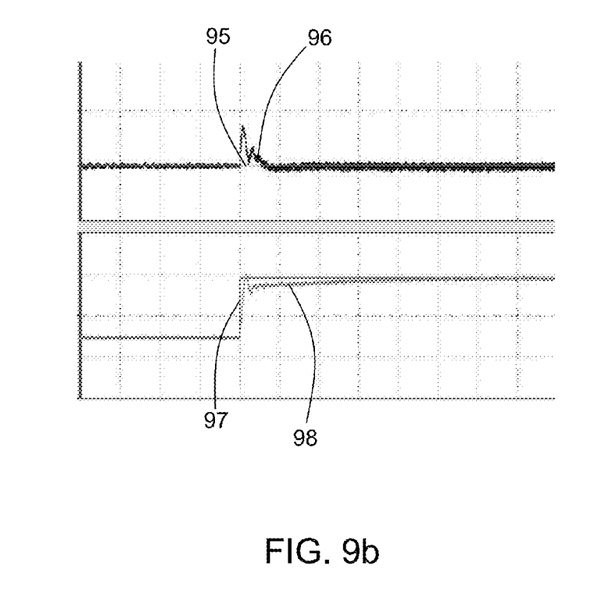

FIGS. 9a and 9b are two simulation diagrams showing reactive power step response of the line side converter controller 164 respectively without and with the PQ decoupling unit 290. In FIG. 9a, the waves 93 and 94 are reactive power command wave and reactive power response wave respectively, and the waves 91 and 92 are active power command wave and active power response wave respectively. When reactive power has a step command and active power command keeps the same, the variation of reactive power influences the active power to a great extent. In FIG. 9b, the waves 97 and 98 are reactive power command wave and reactive power response wave respectively, and the waves 95 and 96 are active power command wave and active power response wave respectively. When reactive power has a step command and active power command keeps the same, the variation of reactive power influences the active power to a much less extent. Thus, the PQ decoupling unit 290 is expected to have a good compensation on decoupling the interaction between active power loop and reactive power loop which can make the grid 18 more stable.

Figure 10:
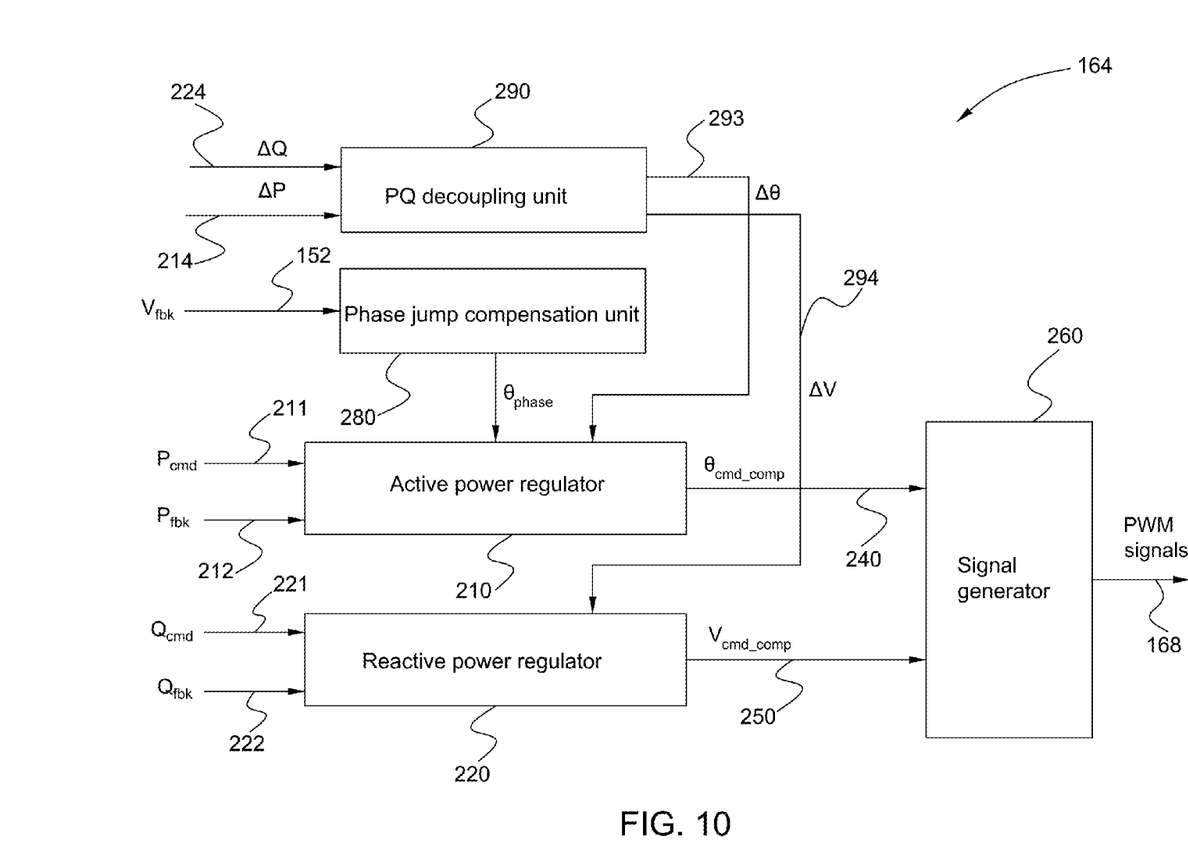
FIG. 10 is a control diagram of a line side converter controller of the solar power conversion system shown in FIG. 1 in accordance with another exemplary embodiment of the present disclosure.

Referring to FIG. 10, a control diagram of the line side converter controller 164 in accordance with another exemplary embodiment of the present disclosure. In comparison to the embodiment of FIG. 2, FIG. 10 further illustrates a phase jump compensation unit 280 which is further included. The phase jump compensation unit 280 is coupled to the active power regulator 210. In an alternative embodiment (not shown), the phase jump compensation unit 280 may be coupled to the reactive power regulator 220. In general, the phase jump compensation unit 280 is configured for tracking the grid voltage signal 152 and providing timelier phase jump information for compensation when phase detection devices such as a phase locked loop (PLL) circuit cannot detect the correct phase angle information as quickly as desired. In other embodiments, the line side converter controller 164 may include other compensation units combined with PQ decoupling unit 290 to increase performance of the line side converter controller 164 together.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A power conversion system comprising:
   a direct current (DC) bus for receiving DC power from a power source;
   a power converter for converting the DC power on the DC bus to alternating current (AC) power; and
   a controller coupled to the power converter for regulating power, the controller comprising:
   an active power regulator for generating a phase angle command signal based on an active power command signal and an active power feedback signal;
   a reactive power regulator for generating a voltage magnitude command signal based on a reactive power command signal and a reactive power feedback signal; and
   an active power (P) and reactive power (Q) decoupling unit for decoupling interaction between the active power regulator and the reactive power regulator, the PQ decoupling unit comprising:

an active power compensation element for generating a phase angle compensation signal based on a reactive power error signal, to compensate the phase angle command signal; and a reactive power compensation element for generating a voltage magnitude compensation signal based on an active power error signal, to compensate the voltage magnitude command signal.

2. The power conversion system of claim 1, wherein the reactive power error signal is equal to a difference between the reactive power command signal and the reactive power feedback signal, or the reactive power error signal is equal to a difference between two reactive power feedback signals at different time points; and wherein the active power error signal is equal to a difference between the active power command signal and the active power feedback signal, or the active power error signal is equal to a difference between two active power feedback signals at different time points.

3. The power conversion system of claim 1, wherein the active power compensation element comprises a first proportional element, and the reactive power compensation element comprises a second proportional element.

4. The power conversion system of claim 3, wherein a proportional factor K1 of the first proportional element is calculated according to the formula: $K1=-R/V_A*V_B*\cos(\theta_A-\theta_B)$, a proportional factor K2 of the second proportional element is calculated according to the formula: $K2=R/V_A*\cos(\theta_A-\theta_B)$, wherein R is a resistance between a point A and a point B of the power conversion system, $V_A$ is a voltage of the point A, $V_B$ is a voltage of the point B, $\theta_A$ is a phase angle of voltage vector $V_A$, and $\theta_B$ is a phase angle of voltage vector $V_B$.

5. The power conversion system of claim 4, wherein $K1=-R/V^2_{Base}$ and $K2=R/V_{Base}$, wherein $V_{Base}$ is a voltage base value.

6. The power conversion system of claim 3, wherein the active power compensation element further comprises a first limiter, and the reactive power compensation element further comprises a second limiter.

7. The power conversion system of claim 1, wherein the active power regulator comprises a first summation element, for subtracting the active power feedback signal from the active power command signal and providing the active power error signal, a power regulator for generating a frequency command signal according to the active power error signal, a phase angle generator for generating the phase angle command signal according to the frequency command signal, and a second summation element for adding the phase angle compensation signal into the phase angle command signal to generate a compensated phase angle command signal.

8. The power conversion system of claim 1, wherein the reactive power regulator comprises a first summation element for subtracting the reactive power feedback signal from the reactive power command and generating the reactive power error signal, a VAR regulator for generating a point of test coupling (POTC) voltage command signal according to the reactive power error signal, a second summation element for subtracting a POTC voltage feedback signal from the POTC voltage command signal to produce a POTC voltage error signal, a second summation element for adding the voltage magnitude compensation signal into the POTC voltage error signal, and a voltage regulator for generating a compensated voltage magnitude command signal according to the compensated POTC voltage error signal.

9. The power conversion system of claim 1, wherein the reactive power regulator comprises a first summation element for subtracting the reactive power feedback signal from the reactive power command and generating the reactive power error signal, a VAR regulator for generating a point of test coupling (POTC) voltage command signal according to the reactive power error signal, a second summation element for subtracting a POTC voltage feedback signal from the POTC voltage command signal to produce a POTC voltage error signal, a voltage regulator for generating the voltage magnitude command signal according to the POTC voltage error signal, and a third summation element for adding the voltage magnitude compensation signal into the voltage magnitude command signal to generate a compensated voltage magnitude command signal.

10. The power conversion system of claim 1, wherein the controller further comprises a phase jump compensation unit for tracking a grid voltage signal and providing phase jump compensation based on the grid voltage signal.

11. A method of operating a power conversion system comprising: generating a phase angle command signal based on an active power command signal and an active power feedback signal; generating a voltage magnitude command signal based on a reactive power command signal and a reactive power feedback signal; generating a phase angle compensation signal based on a reactive power error signal, to compensate the phase angle command signal; generating a voltage magnitude compensation signal based on an active power error signal, to compensate the voltage magnitude command signal; and generating control signals for a power converter of the power conversion system for causing an AC voltage output from the power converter to decouple interaction between an active power loop and a reactive power loop based on a compensated phase angle command signal and a compensated voltage magnitude command signal.

12. The method of claim 11, wherein the reactive power error signal is equal to a difference between the reactive power command signal and the reactive power feedback signal, or the reactive power error signal is equal to a difference between two reactive power feedback signals at different time points; and wherein the active power error signal is equal to a difference between the active power command signal and the active power feedback signal, or the active power error signal is equal to a difference between two active power feedback signals at different time points.

13. The method of claim 11, wherein the phase angle compensation signal is generated by a first proportional element, and the voltage magnitude command signal is generated by a second proportional element.

14. The method of claim 13, wherein a proportional factor K1 of the first proportional element is calculated according to the formula: $K1=-R/V_A*V_B*\cos(\theta_A-\theta_B)$, a proportional factor K2 of the second proportional element is calculated according to the formula: $K2=R/V_A*\cos(\theta_A-\theta_B)$, wherein R is a resistance between a point A and a point B of the power conversion system, $V_A$ is a voltage of the point A, $V_B$ is a voltage of the point B, $\theta_A$ is a phase angle of voltage vector $V_A$, $\theta_B$ is a phase angle of voltage vector $V_B$.

15. The method of claim 14, wherein $K1=-R/V^2_{Base}$ and $K2=R/V_{Base}$, wherein $V_{Base}$ is a voltage base value.

16. The method of claim 13, further comprising: limiting an output signal from the first proportional element according to a first predetermined threshold value; and limiting an output signal from the second proportional element according to a second predetermined threshold value.

17. The method of claim 11, wherein the phase angle compensation signal is directly added into the phase angle command signal, to compensate the phase angle command signal.

18. The method of claim 11, wherein the voltage magnitude command signal is added into a voltage error signal and provides a compensated voltage error signal, and then a compensated voltage magnitude command signal is generated based on the compensated voltage error signal.

19. The method of claim 11, wherein the voltage magnitude command signal is directly added into the voltage magnitude command signal, to compensate the voltage magnitude command signal.

20. The method of claim 11, further comprising: providing a phase jump compensation based on a tracked grid voltage signal.

\* \* \* \* \*